Sept. 30, 1958
G. W. MELVILLE
2,853,771
PIPE FITTING STAND
Filed Dec. 20, 1954
2 Sheets-Sheet 1
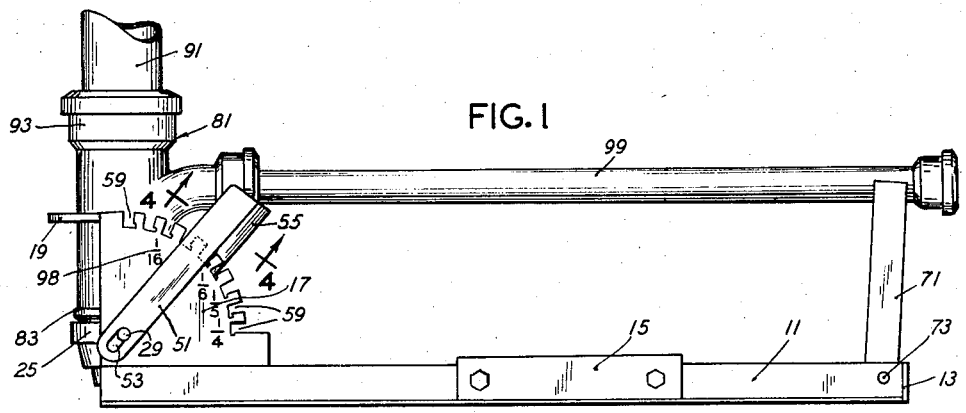
FIG. 1
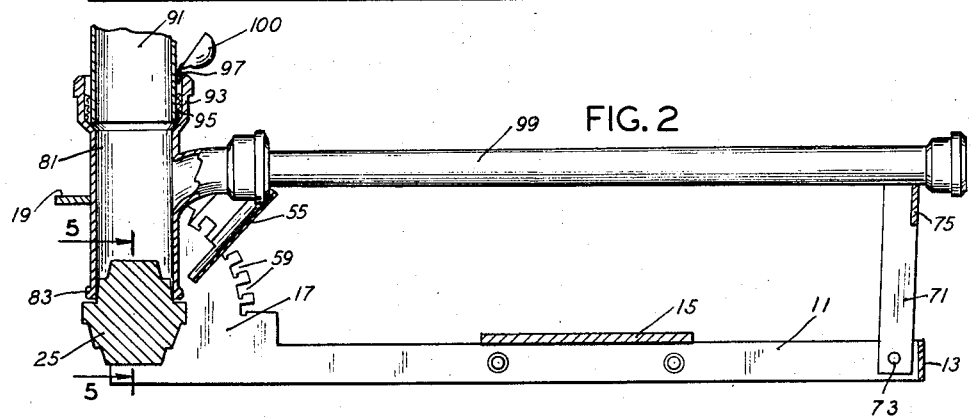
FIG. 2
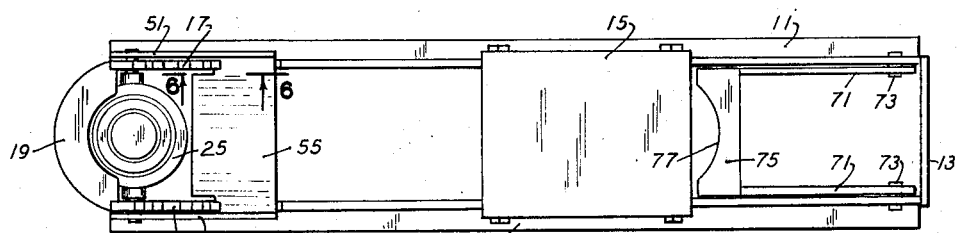
FIG. 3
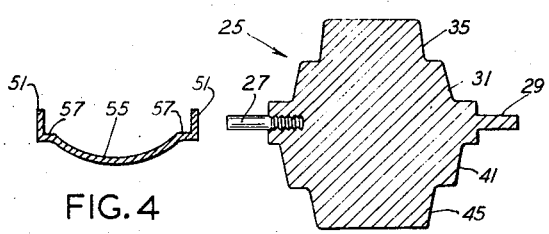
FIG. 4
FIG. 5
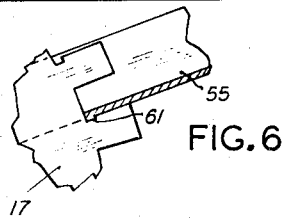
FIG. 6
INVENTOR.
GEORGE W. MELVILLE
BY
Buckhorn and Cheatham
ATTORNEYS

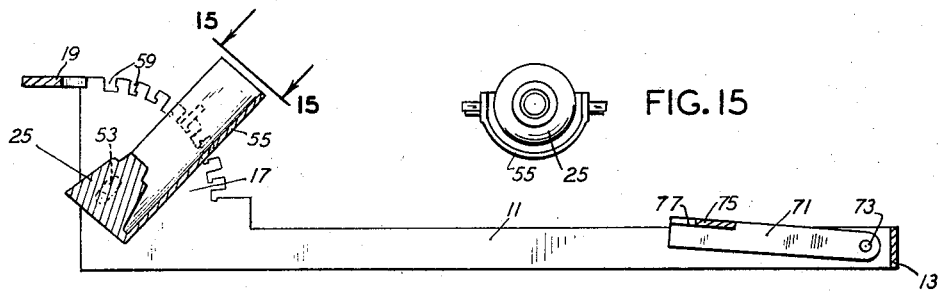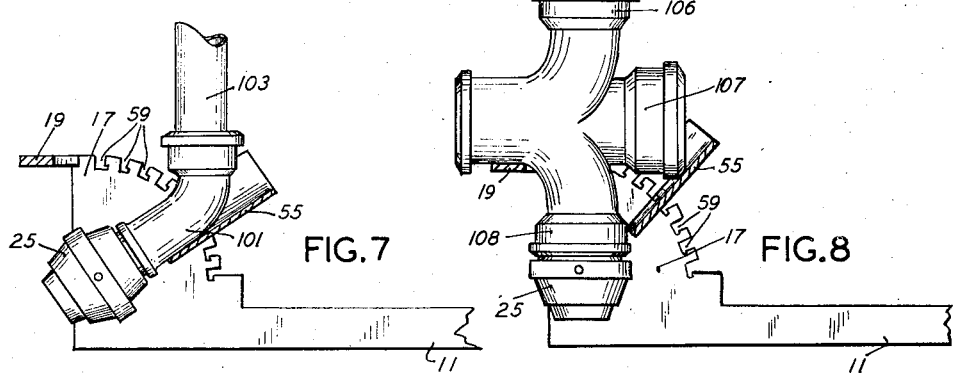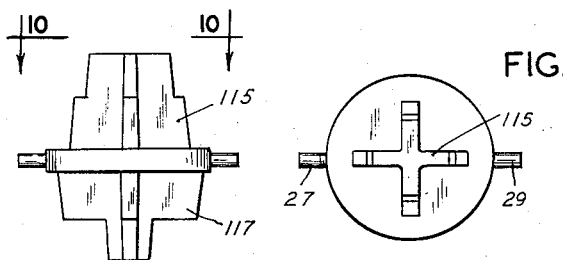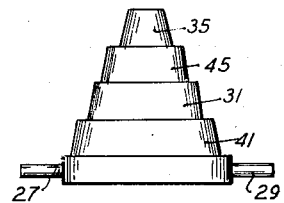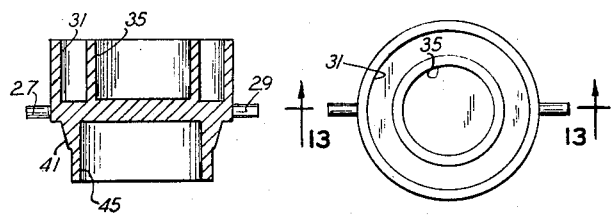

United States Patent Office 2,853,771
Patented Sept. 30, 1958

2,853,771
PIPE FITTING STAND
George W. Melville, Reedsport, Oreg.
Application December 20, 1954, Serial No. 476,470
3 Claims. (Cl. 29—286)

This invention relates to apparatus for facilitating the making of leaded joints between pipe and pipe fittings.

Heretofore, various makeshift methods have been employed to make leaded joints between pipe and pipe fittings. Sometimes, one worker will hold a fitting with the desired bell end facing upwardly in position to receive an end of a pipe section and in position to hold lead poured into such bell end by another worker. At other times the particular fitting being used will be propped up against any convenient object in a position with the desired bell end facing upwardly to enable a worker to make a leaded joint between such bell end and the end of a pipe section.

These methods are tedious in that, because of the different configurations of different types of fittings, each type of fitting must be supported in a different manner in order that the selected bell end will be disposed facing upwardly. Furthermore, during pouring of the lead, not infrequently fittings so propped have fallen or slipped out of position, causing the lead to be spilled, in some cases injuring the workers or creating defective joints.

A main object of the present invention is to provide an apparatus permitting leaded joints between pipes and different types of fittings to be readily formed or made, and necessitating the attention of only one worker.

A more particular object of the present invention is to provide an apparatus of the type above described which is adjustable to selectively support different types of fittings, each in proper positions for forming a leaded joint with a desired end thereof.

A further object of the present invention is to provide an apparatus of the above type which is simple and inexpensive in construction.

Various other objects of the present invention will be apparent from the following description taken in connection with the accompanying drawings wherein:

Fig. 1 is a side view showing an apparatus embodying the concepts of the present invention, with a sanitary single T branch fitting shown as being supported in position for making a joint with a bell end of the fitting;

Fig. 2 is a longitudinal, vertical midsectional view through the apparatus of Fig. 1;

Fig. 3 is a top view of the apparatus disclosed in Fig. 1, the fitting being removed to more fully disclose the construction of the apparatus;

Fig. 4 is a sectional view taken along line 4—4 of Fig. 1;

Fig. 5 is a sectional view taken along line 5—5 of Fig. 2;

Fig. 6 is a fragmentary sectional view taken along line 6—6 of Fig. 3;

Fig. 7 is a schematic fragmentary view of the apparatus disclosed in Fig. 1, showing the apparatus supporting a different type fitting from that shown in Fig. 1;

Fig. 8 is a view similar to Fig. 7, but showing the apparatus supporting a fitting of a type different from that disclosed in either Fig. 1 or 7;

Fig. 9 is a side view of a modified form of end holder or chuck;

Fig. 10 is a top view of the chuck disclosed in Fig. 9;

Fig. 11 is a side view of still another modified end holder or chuck;

Fig. 12 is a top end view of a still further modified form of end holder or chuck;

Fig. 13 is a sectional view taken along line 13—13 of Fig. 12;

Fig. 14 is a vertical, longitudinal sectional view through a modified apparatus embodying the concepts of the present invention; and Fig. 15 is a view taken in the direction of the arrow 15—15 of Fig. 14.

Referring to the accompanying drawings wherein similar reference characters designate similar parts throughout, the apparatus disclosed in Figs. 1 through 8 includes a base, which may assume any convenient form, but is shown as including a pair of parallel spaced side members 11 of angle iron, such side members being fixed in spaced relation by an end piece 13 and by an intermediate spacer 15. Fixed to the left-hand end of each side member is a quadrant shaped mounting plate 17, the plates being joined at their upper left-hand portions by an arc-shaped retainer 19.

Disposed generally between the mounting plates at the lower left-hand portions thereof is a fitting end holder or chuck including a body 25 which is pivotally supported on said plates by trunnions 27 and 29 (Fig. 5). Trunnion 27 is removably threadedly received by body 25, as shown, to permit assembling of the parts of the apparatus.

Referring to Fig. 5, body 25 is shown as including two oppositely facing integral parts, one part including a first reduced frusto-conical or tapered portion 31 and a second and further reduced frusto-conical or tapered portion 35. The other part of the body includes a first reduced frusto-conical portion 41 and a second and further reduced frusto-conical portion 45.

Each frusto-conical or tapered portion is adapted to receive and support a certain end or ends of a particular size pipe fitting, as will be presently described. At present, suffice it to say that the body 25 will support an end of only one pipe fitting at a time.

Trunnions 27 and 29 project through mounting plates 17 (Fig. 3), and mounted on the projecting portions of such trunnions is a cradle or rest, which includes a pair of arms 51, slotted at their lower ends at 53 to receive the trunnions, and being joined at their opposite or upper ends by a curved cradle or rest portion 55. Fig. 4 shows the cross-sectional configuration of the upper portion of the cradle or rest, and there it is apparent that the cradle or rest portion 55 has the opposite side margins thereof bent at 57 adapting such margins to fit selectively within a plurality of notches 59 provided in the arcuate margins of mounting plates 17. The notches are spaced about such arcuate margins in accordance with a predetermined pattern, as will presently be discussed.

Referring to Fig. 6, each side margin 57 of the cradle or rest portion 55 has a stop 61 portion fitting within a complementary recess formed in the associated mounting plate, there being one such recess for each notch. The stops at 61 thus prevent accidental radial movement of the cradle or rest from the position shown. When it is desired to position the cradle in another set of notches 59, the cradle or rest is moved slightly counterclockwise, as the parts are shown, to clear the stops of the associated recesses, then moved radially outwardly, the slots at 53 in arms 51 permitting such movement, and then swung clockwise or counterclockwise to a new position and set back in another selected pair of notches 59.

The apparatus also includes a foot end pipe rest comprising a pair of arms 71 pivoted at 73 to the side members 11, and joined at their upper ends by a rest member 75. The rest member 75 has a curved recess at 77 to accommodate a pipe section.

The operation of the apparatus is as follows. A sanitary single T branch pipe fitting 81 is disclosed as being mounted on the apparatus, the lower spigot end 83 of the fitting being set or mounted onto the tapered surface 31. Tapered surface 31 is designed to fit the spigot end of the particular size fitting shown. For instance, if the fitting is a four inch fitting, the surface 31 would be designed to receive and support the spigot end of such a four inch fitting, whereas the tapered surface 41 of the lower part of the chuck or end holder would be designed to receive and support the bell end of such a fitting.

The mounting plates 17 preferably carry indicia 98 adjacent the notches 59 indicating the position the cradle or rest must occupy in order to properly support or hold different types of fittings. In the instance shown, the cradle or rest is arranged in those notches designed to support a four inch single branch T sanitary fitting for making a joint with the main bell end. The curved rest portion 55 is shown as engaging the lower part of the bell end of the branch of the fitting, the retainer at 19 serving as a stop against which the fitting is held by the rest.

With the particular fitting disclosed in Figs. 1 and 2, it has been assumed that a pipe section 99 has been previously joined at one end to the bell end of the branch of the fitting. With such an assembly, the foot rest member at 71 is moved from its collapsed position shown in Fig. 3, to its erect position shown in Figs. 1 and 2, to support the free end of the pipe section 99.

It is apparent from Figs. 1 and 2 that the arrangement and adjustment of the parts of the apparatus is such as to stably support or hold the fitting with bell end 93 facing upwardly with its end face disposed in a horizontal plane. Now, suitable caulk 95 is pounded into place between the lower end of a pipe section 91 and the bell end 93 of the fitting 81. Then, molten lead or other suitable solidifiable liquid 97 is poured into the bell end 93, such as by means of a ladle 100 to make a connection between pipe 91 and fitting 81. Because of the horizontal position of end 93, the lead will be contained by such end. After the joint is made, the fitting can be simply lifted off the chuck 25 and a new fitting placed on the chuck.

The joint between the branch bell end and the pipe section 99 could be readily formed either after the formation of the joint at main bell end 93 or previous to such formation. If the joint at the branch bell end is to be formed after the formation of the joint at 93, the cradle or rest may be swung downwardly to a horizontal position and the fitting merely rotated on the chuck 25 180° to dispose the branch bell end upwardly with its end face in a horizontal plane, and with the loose pipe section 91 resting on the collapsed foot rest 71.

The making of a joint between the branch bell end and pipe section 99 prior to the time that a joint is made between bell end 93 and pipe section 91 is carried out in a manner almost identical to that described above, except that because of the absence of the pipe 91, the position of the foot rest 71 is of no importance.

Fig. 7 is a fragmentary view showing schematically a joint being formed between a ⅛ bend fitting 101 and a pipe section 103. To properly support such fitting, the spigot end thereof is mounted or placed onto the chuck 25, it being assumed that the pipe fitting employed is smaller in size than that disclosed in Figs. 1 and 2, say a three inch fitting. Thus, the tapered surface at 35 is the one on which the spigot end of the fitting 101 is mounted. The bell end of a three inch fitting may fit on tapered portion 45.

The rest or cradle at 55 is adjusted along the notches 59 to the position marked for a ⅛ bend three inch fitting. Thus, when the fitting is set on the chuck 25 in a properly oriented position and rested at the intermediate portion thereof on the rest portion 55, the fitting is supported or held with the bell end face in substantially a horizontal plane. With the fitting thus stably supported, the making of a leaded joint between the bell end of the fitting and the pipe 103 may be readily carried out.

It is pointed out that because of the frictional engagement between the spigot end of a fitting and the chuck 25 and the frictional engagement of a fitting and the cradle 55, the fitting will remain in a position in which it is arranged on the stand. The curvature of the cradle assists in maintaining the fitting in such position. It is evident, however, that the upper portions of arms 51 would prevent a fitting from turning any substantial extent one way or the other within the cradle.

Fig. 8 shows schematically a still different type of fitting mounted in the apparatus. The particular fitting 107 shown is known as a sanitary double T branch fitting, each branch of the fitting having a bell end formed thereon. As the parts are arranged, the fitting is mounted so that a joint can be made between the branch bell end 106 of the fitting and the lower end of the pipe section 109. In order to properly support the fitting, it is necessary to mount the bell end of the opposite branch 108 on the chuck 25. It is assumed that the fitting is of a larger size, for instance a four inch fitting, so that the chuck 25 must be pivoted to present the tapered surface 41 to the fitting, the lower branch bell end 108 being mounted on such surface. The cradle or rest at 55 is adjusted to engage the main bell end of the fitting, as indicated, the spigot end of the fitting extending outwardly over the retainer 19. With the fitting 107 stably supported, the joint between the upper branch bell end and the pipe section 109 can readily be made.

With reference to each of the fittings so far described as being mounted in the apparatus of the present invention, it is pointed out that the cradle or rest 55 engages the fitting at an intermediate portion between the end mounted on the chuck and the end being joined. In Fig. 1, the cradle or rest engages the branch bell end, which may be considered an intermediate portion of the fitting, and in Fig. 7, the cradle or rest engages the intermediate portion of the fitting there shown, and in Fig. 8 the rest engages the main bell end of the fitting, this main bell end, however, being an intermediate portion with reference to the branch bell ends, when the fitting is arranged as shown. Therefore, in the specification and claims, what is meant by the cradle engaging an intermediate portion of a fitting, is an engagement intermediate the end which is mounted respectively on the chuck 25 and the end to be joined.

Figs. 9 and 10 show a modified chuck or end holder, which is very similar to the chuck or holder disclosed in Figs. 1 through 8, but differing therefrom in that the fitting-engaging surfaces are provided by stepped flanges 115 and 117. The number of flanges may be varied, just so the end of a fitting which is mounted on the chuck will be supported and held against lateral shifting movement.

Fig. 11 illustrates a modified chuck in which the four tapered surfaces for fitting on the spigot and bell ends of two size fittings are provided on one side of the chuck. The respective surfaces are given similar reference numerals to those employed in Fig. 5 for ready comparison.

Figs. 12 and 13 show a still further modified chuck or end holder, and there it is apparent that instead of the chuck or end holder fitting within a pipe fitting, certain portions thereof may fit on the exterior portions of the pipe fitting and perform substantially the identical function as the type of chuck or end holder disclosed in Fig. 5. In order to indicate corresponding parts between Figs. 12 and 13, and Fig. 5, corresponding numerals have been employed, the numerals in Fig. 13 being given prime marks to differentiate them from the ones in Fig. 5.

Figs. 14 and 15 show a modified form of apparatus wherein the chuck or end holder 25' is fixedly connected to the cradle or rest 55' instead of the two members being independently pivotally mounted as in the previous form of the invention. A fitting is mounted within the apparatus disclosed in Figs. 14 and 15 in a manner very similar to that described in connection with the first described apparatus. However, because there is no relative movement between the chuck or end holder and the cradle, the apparatus in Fig. 14 finds its primary use in handling different types of bend fittings, and cannot, for instance, be employed to form joints with all the bell ends of a sanitary T double branch fitting of the type disclosed in Fig. 8.

The apparatus in Figs. 14 and 15 could, however, handle the single branch T type fitting disclosed in Fig. 1 by reversing the position of the fitting disclosed in Fig. 1, so that the branch projects outwardly over the retainer 19.

The present invention is not intended to be limited to the particular type chuck disclosed, since a chuck having movable jaws or spring fingers could also be employed, although of course they would be more expensive than the particular ones disclosed. Also, reference to three and four inch fittings in the specification is merely for purposes of illustration, and obviously a chuck may be designed to handle other sizes or types of fittings. Furthermore, a chuck may be formed to handle one size fitting, or to handle two or more size fittings.

Those skilled in the art will appreciate that with an apparatus embodying the concepts of the present invention joints between various types of fittings and pipe sections may be formed readily and properly.

Having described the invention in what are considered to be the preferred embodiments thereof, it is desired that it be understood that the invention is not to be limited by the specific details shown unless they constitute critical features of the present invention, all of which will be apparent by reference to the following claims.

I claim:

1. A pipe fitting stand comprising a frame including a pair of spaced parallel opposed mounting plates, a chuck freely pivotally supported between said plates and having work-engaging portions arranged concentrically around an axis perpendicular to the pivotal axis of the chuck, a rest independently pivotally mounted on said mounting plates for movement about said pivotal axis and having a portion spaced from the pivotal axis of said rest and operable to engage a pipe fitting at a place spaced from said chuck, and cooperable means on said rest and said mounting plates for selectively holding said rest in various positions of adjustment relative to such plates.

2. A pipe fitting stand comprising a frame including a pair of spaced parallel opposed mounting plates, a chuck freely pivotally supported between said plates about an axis normal to said plates and having work-engaging portions arranged concentrically around an axis perpendicular to the pivotal axis of the chuck for engaging an end of a pipe fitting, a rest independently pivotally mounted on said mounting plates for movement about said pivotal axis and having a portion spaced from said chuck for engaging a pipe fitting at a place spaced from the mentioned end thereof, cooperable means on said rest and said mounting plates for selectively holding said rest in various positions of adjustment relative to such plates, and a second rest disposed in spaced relation from said chuck and the first-named rest in a direction at right angles to the pivotal axis of said chuck and operable for suppporting a length of pipe projecting from a fitting supported by said chuck.

3. A pipe fitting stand comprising a stand frame, a fitting support pivotally mounted on said frame for movement about a horizontal axis, means on said support for engaging an open end of a fitting and disposing said fitting with the axis of said end arranged at right angles to said horizontal axis, a second fitting support having means for engaging the exterior of said fitting at a place spaced from said open end to assist said first support in supporting said fitting, said second support being pivotal about said horizontal axis independently of the position of said first support so that different types of fittings may be properly engaged by said supports to dispose another open end of each in an upwardly facing position to facilitate the formation of a leaded joint at said another open end, and means for releasably holding said second support in different positions relative to said frame.

References Cited in the file of this patent

UNITED STATES PATENTS

| | | |
|---|---|---|
| 285,590 | Drummond | Sept. 25, 1883 |
| 402,108 | Ries | Apr. 23, 1889 |
| 1,393,125 | Henon | Oct. 11, 1921 |
| 1,648,474 | Coleman et al. | Nov. 8, 1927 |
| 2,323,039 | Hill | June 29, 1943 |
| 2,396,452 | Widmark et al. | Mar. 12, 1946 |
| 2,700,949 | Kunzi | Feb. 1, 1955 |
| 2,724,175 | Kjellberg | Nov. 22, 1955 |
| 2,774,134 | Smith et al. | Dec. 18, 1956 |

FOREIGN PATENTS

| | | |
|---|---|---|
| 609,346 | Great Britain | Sept. 28, 1948 |